(12) United States Patent
McCurdy et al.

(10) Patent No.: US 9,558,191 B2
(45) Date of Patent: Jan. 31, 2017

(54) AUTOMATIC IDENTIFICATION OF PHOTO BOOKS SYSTEM AND METHOD

(75) Inventors: Kevin McCurdy, Hanover, NH (US); Dennis John, Meridian, ID (US)

(73) Assignee: Picaboo Corporation, Hanover, NH (US)

( * ) Notice: Subject to any disclaimer, the term of this patent is extended or adjusted under 35 U.S.C. 154(b) by 901 days.

(21) Appl. No.: 12/872,441

(22) Filed: Aug. 31, 2010

(65) Prior Publication Data

US 2012/0054647 A1    Mar. 1, 2012

(51) Int. Cl.
*G06F 3/0483* (2013.01)
*G06F 17/30* (2006.01)
*H04N 1/00* (2006.01)
*H04N 1/21* (2006.01)
*H04N 1/32* (2006.01)

(52) U.S. Cl.
CPC .... *G06F 17/30047* (2013.01); *H04N 1/00127* (2013.01); *H04N 1/00196* (2013.01); *H04N 1/00413* (2013.01); *H04N 1/2166* (2013.01); *H04N 1/32128* (2013.01); *H04N 2201/3212* (2013.01); *H04N 2201/3261* (2013.01); *H04N 2201/3274* (2013.01)

(58) Field of Classification Search
CPC .............................. G06F 9/4443; G06F 3/0483
USPC ........................................ 715/763, 776, 731
See application file for complete search history.

(56) References Cited

U.S. PATENT DOCUMENTS

| | | | |
|---|---|---|---|
| 6,636,648 B2* | 10/2003 | Loui et al. .................... 382/284 |
| 6,680,206 B1* | 1/2004 | McDevitt et al. ............ 436/172 |
| 6,704,733 B2* | 3/2004 | Clark et al. ................... 705/26.1 |
| 7,102,158 B2* | 9/2006 | Tysoe et al. ..................... 257/48 |
| 7,117,453 B2* | 10/2006 | Drucker et al. ............... 715/833 |
| 7,340,676 B2* | 3/2008 | Geigel et al. ................. 715/716 |
| 7,743,322 B2* | 6/2010 | Atkins .......................... 715/243 |
| 7,844,115 B2* | 11/2010 | Ohwa et al. .................. 382/190 |
| 8,412,663 B2* | 4/2013 | Jiang ....................... G06N 5/04 706/47 |
| 8,560,672 B2* | 10/2013 | Malhotra ............... G06Q 10/08 709/224 |
| 2002/0082939 A1* | 6/2002 | Clark et al. ...................... 705/26 |
| 2003/0099526 A1* | 5/2003 | Saw et al. ........................ 412/19 |
| 2003/0191669 A1* | 10/2003 | Fitzgerald ............. G06F 19/322 705/2 |
| 2005/0125371 A1* | 6/2005 | Bhide et al. ....................... 707/1 |
| 2005/0125726 A1* | 6/2005 | Harper et al. ................. 715/517 |
| 2007/0291117 A1* | 12/2007 | Velipasalar et al. .......... 348/152 |
| 2008/0005666 A1* | 1/2008 | Sefton et al. ................. 715/523 |
| 2008/0114709 A1 | 5/2008 | Dixon et al. |
| 2008/0155422 A1* | 6/2008 | Manico et al. ................ 715/731 |
| 2008/0215615 A1* | 9/2008 | Hoover et al. ............ 707/103 R |
| 2008/0270930 A1* | 10/2008 | Slosar ........................... 715/776 |
| 2009/0006951 A1* | 1/2009 | Mori et al. .................... 715/273 |
| 2009/0100369 A1* | 4/2009 | Mindrum ...................... 715/776 |

(Continued)

OTHER PUBLICATIONS

PCT International Search Report of PCT/US11/49800; dated Jan. 12, 2012.

(Continued)

*Primary Examiner* — Phenuel Salomon
(74) *Attorney, Agent, or Firm* — DLA Piper LLP (US)

(57) ABSTRACT

An automatic identification of one or more content books system and method are provided in which the one or more content books are identified based on holidays or events selected by the user.

9 Claims, 8 Drawing Sheets

(56) References Cited

U.S. PATENT DOCUMENTS

2009/0319472 A1  12/2009  Jain et al.
2010/0076994 A1   3/2010  Soroca et al.

OTHER PUBLICATIONS

PCT Written Opinion of the International Searching Authority of PCT/US11/49800; dated Jan. 12, 2012.

\* cited by examiner

ADD CUSTOM OCCASIONS (OPTIONAL)

YOUR WEDDING DAY
[SELECT MONTH ▾] [SELECT DAY ▾] [SELECT YEAR ▾]

IMPORTANT BIRTHDAYS
[SELECT MONTH ▾] [SELECT DAY ▾] [SELECT YEAR ▾]
BIRTHDAY

FIRST NAME

+ ADD ANOTHER BIRTHDAY

[ADD HOLIDAYS >] [FINISHED]

FIG. 3

CUSTOMIZE HOLIDAYS

US & CANADIAN HOLIDAYS
- ☐ NEW YEAR'S
- ☐ VALENTINE'S DAY
- ☐ ST. PATRICK'S DAY
- ☐ EASTER
- ☐ MOTHER'S DAY
- ☐ VICTORIA DAY (CAN)
- ☐ MEMORIAL DAY
- ☐ FATHER'S DAY
- ☐ MEMORIAL DAY (CAN)
- ☐ 4TH OF JULY
- ☐ LABOR DAY
- ☑ HALLOWEEN
- ☐ THANKSGIVING
- ☐ THANKSGIVING (CAN)
- ☑ CHRISTMAS

OTHER HOLIDAYS
- ☐ ROSH HASHANAH
- ☐ HANUKKAH
- ☐ PASSOVER
- ☐ CINCO DE MAYO
- ☐ KWANZAA
- ☐ CHINESE NEW YEAR

[ < BACK ]  [ FINISHED ]

FIG. 4

IDENTIFIED PHOTO BOOKS
☐ LAST 30 DAYS
☐ LAST 3 MONTHS
▼ 2010
☐ THE YEAR IN PHOTOS
☐ SUMMER '10
☐ SPRING '10
☐ EASTER '10
☐ WINTER '09 / '10
▼ 2009
☐ THE YEAR IN PHOTOS
☐ CHRISTMAS '09

FIG. 6

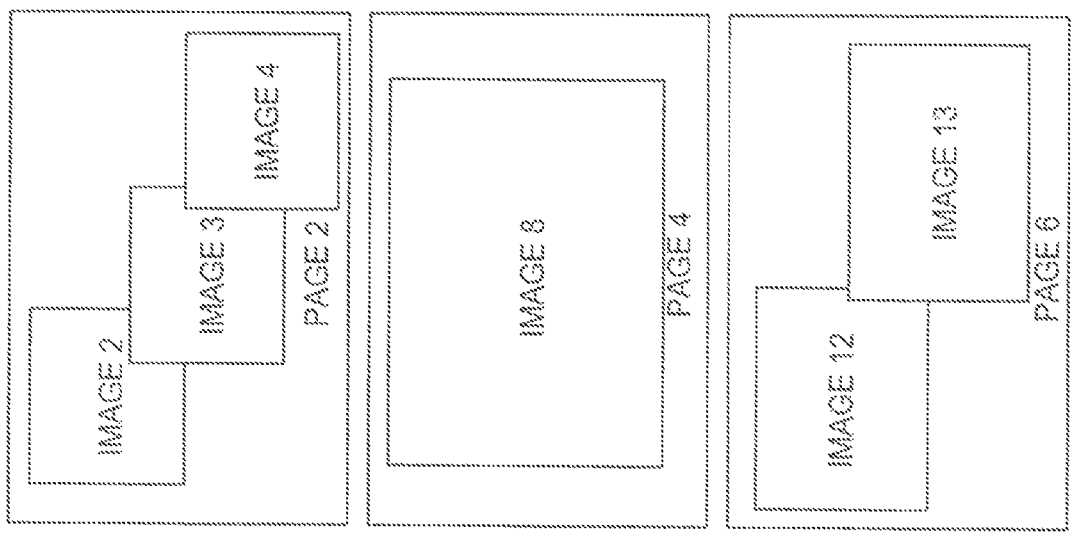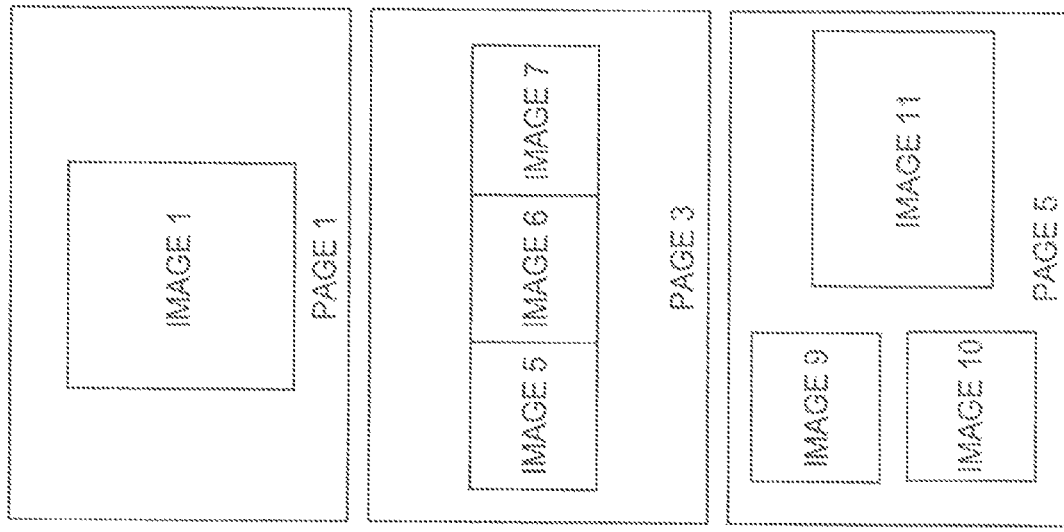
FIG. 7

AUTOMATIC IDENTIFICATION OF PHOTO BOOKS SYSTEM AND METHOD

FIELD

The disclosure relates generally to a system and method for generating a photo book and in particular to a system and method for automatically identifying and generating a content book.

BACKGROUND

Systems and method that permit a user to organize a plurality of pieces of content are known. For example, the Picture Manager utility in Windows® allows a user to view a plurality of digital images, arrange the digital images and then view the plurality of digital images as a slide show. In addition, one can use Microsoft® Powerpoint® to generate and arrange a series of slides wherein each slide can contain one or more digital images so that a slideshow with the slides containing the digital images is generated. In addition, video editing system (both high end movie studio type systems and consumer systems) exist that allow a user to put together clips of video images into a movie or other video show.

However, no existing system is capable of automatically identifying a content book and generating one or more page layouts for a book and it is to this end that the system and method are directed.

BRIEF DESCRIPTION OF THE DRAWINGS

FIG. 3 is an example of a user interface for adding a customized event;

FIG. 4 is an example of a user interface for adding customized holidays;

FIG. 6 is an example of a user interface for selecting one or more identified content book; and FIG. 7 is an example of one or more page layouts for a content book.

DETAILED DESCRIPTION OF ONE OR MORE EMBODIMENTS

The disclosure is particularly applicable to a web-based photo/image book generation system and method and it is in this context that the disclosure will be described. It will be appreciated, however, that the system and method has greater utility since it can be implemented using various different hardware and software different than those disclosed below and may be used as a independent system (not part of the web-based photo book system), as part of a different content system, as a desktop application that is connected to the Internet and a web site (such as the photo book system, or with other systems in which it is desirable to be able to select a date range and generates one or more pages of a book automatically. In addition, the content clustered and laid out in the book may be various types of content including text and the like. Now, an example of a photo book system and method that can utilize the automatic identification and book generating system and method is described for illustration purposes.

Figure 1A:
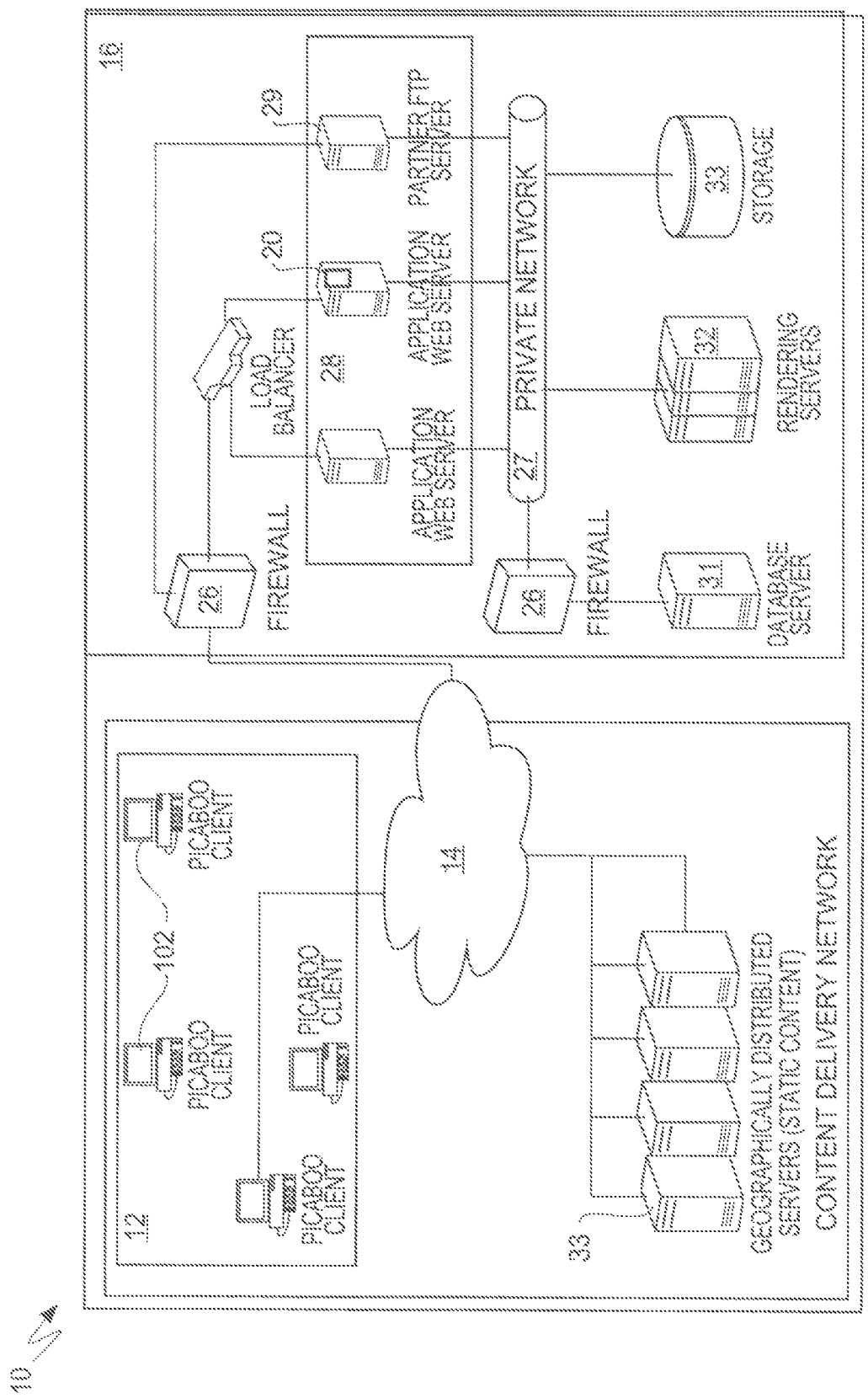
FIG. 1A is an example of an implementation of the photo story book system that incorporates the automatic identification and generation of a content book capabilities.

FIG. 1A is an example of an implementation of a web based photo story book system 10 that incorporates the automatic identification and generation of a content book capabilities. The web-based system, that may be a photo book system of Picaboo (www.picaboo.com) may include one or more computing devices 102 (such as the plurality of Picaboo clients as shown in FIG. 1) that may each be a processing unit based device with sufficient memory, display capabilities, storage space. processing power and connectivity (wired or wireless) to access and interact with a photo system 16 over a communications link 14 (wired or wireless). For example, each computing device may be a personal computer, laptop computer, desktop computer, a wireless device, a wireless email device, an integrated device such as a RIM Blackberry or Palm Treo device, a mobile phone or a cellular phone. The link 14 is in turn connected to a firewall device 26 that protects the internal network from malicious activities by having all data into and out from the internal systems pass through the firewall. The internal systems (that are behind the firewall) may include one or more application web servers 28 (one or more of which may execute the photo book system 20 that may be implemented in software in one embodiment) that receive requests and information from the computing devices and generate one or more web pages that contain information that can be displayed in a known browser application being executed by each computing device. The system may also include a known database server 31 that receives data requests, queries a storage unit 33 (that stores the various data and information associated with the photo book system) and delivers the requested data to the appropriate system element and one or more rendering servers 32 that renders the bound image albums that are produced by the photo system. The photo system 16 may be used to upload images and then generate a photo album based on the uploaded images of the user.

The main client application (that interacts with Picaboo unit 12 in FIG. 1) is the Picaboo application. The web application is this implementation may include the private proxies, account verification, file transfers, order pages and/or preview. The server application in the implementation may include album publishing, image extraction, data synchronization, rendering, user gateway, user registration and the session server.

Each Picaboo client 12 may be implemented as a hardware unit, as a combination of hardware and software (such as a computing device with a plurality of lines of code being executed by the processor of the computing device) or a software which has a plurality of lines of code being executed by the processor of a computing device of the user who is executing the Picaboo client. The Picaboo client allows the user to interact with the photo book system. For example, the Picaboo client allows a user to layout one or more pieces of content so that a book, when completed, can be printed for the user.

Figure 1B:
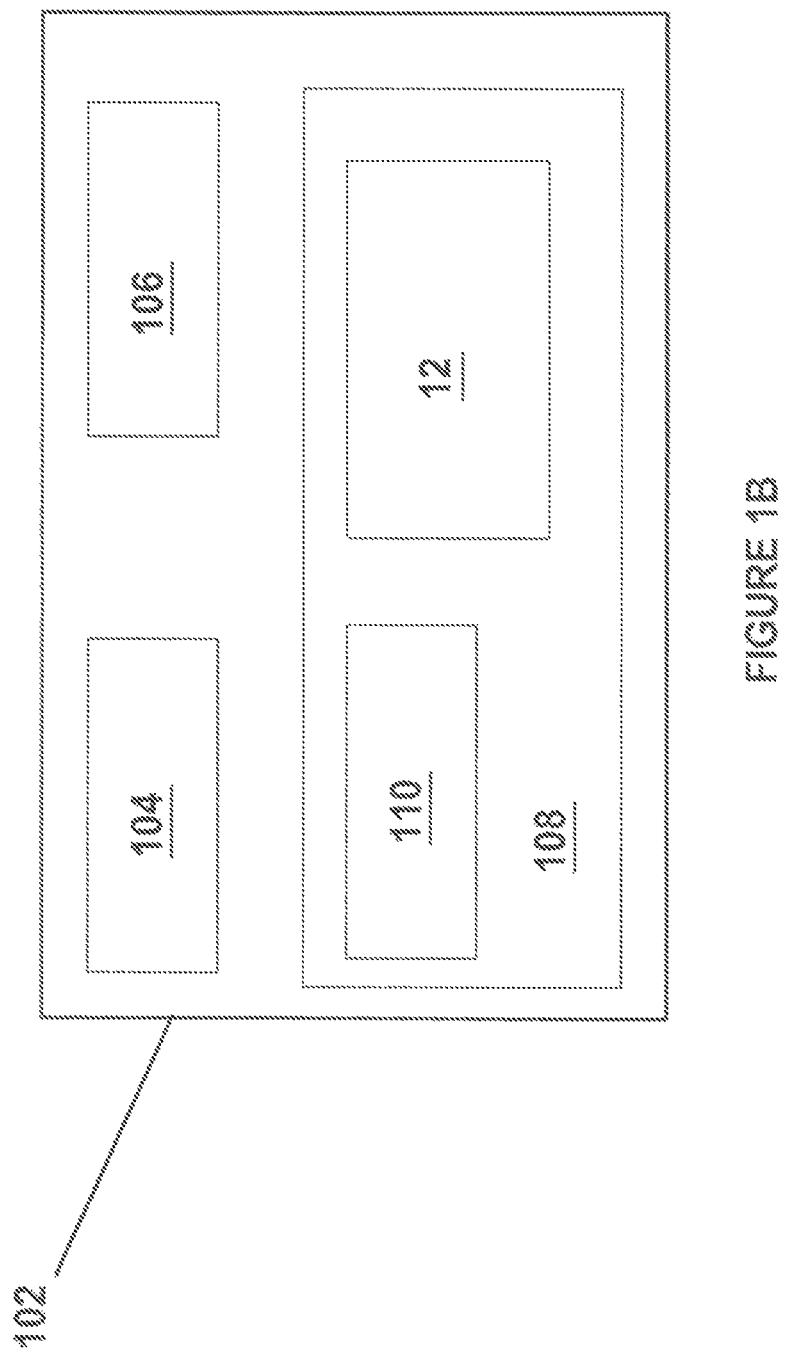
FIG. 1B illustrates more details of the client computing device of the photo story book system.

FIG. 1B illustrates more details of the computing device 102 of the photo story book system that includes the client 12. Each computing device 102 may include one or more processing units 104, one or more storage devices 106 (that may be various types of electronic/optical/magnetic, etc. storage devices and a memory 108 from which applications may be read into and then executed by the one or more processing units. For example, the memory may have an operating system 110 that controls the overall operation and functioning of the computing device as is well known and the client application 12 that is a plurality of lines of computer code that can be executed by the one or more processing units of the computing device. The client application performs various functions and operations including interfacing with the photo system 16. The client application 12 also may have a plurality of lines of computer code that implement the automatic identification and book generation method as described below. The lines of computer code that implement the automatic identification and book generation method may be a book identification unit within the client application or it may be implemented as separate hardware and hardware/software. The book identification unit may further comprise a plurality of components that implement the processes described below in FIG. 2, such as a user component, a determining component, a clustering component and a display component and the like. Alternatively, the automatic identification and book generation method may be performed on the photo system and then the results are delivered to the client application. In one implementation, the part of the client application that implements the date range automatic book generation method may be implemented as an Adobe® Air Application using the Flex 3.5 framework and the logic is written in the Actionscript 3.0 language and uses XML for all storage and data structures. The computing device/client application also may store a plurality of pieces of content of the user of the computing device wherein the plurality of pieces of content of the user each have metadata associated with them.

Figure 2:
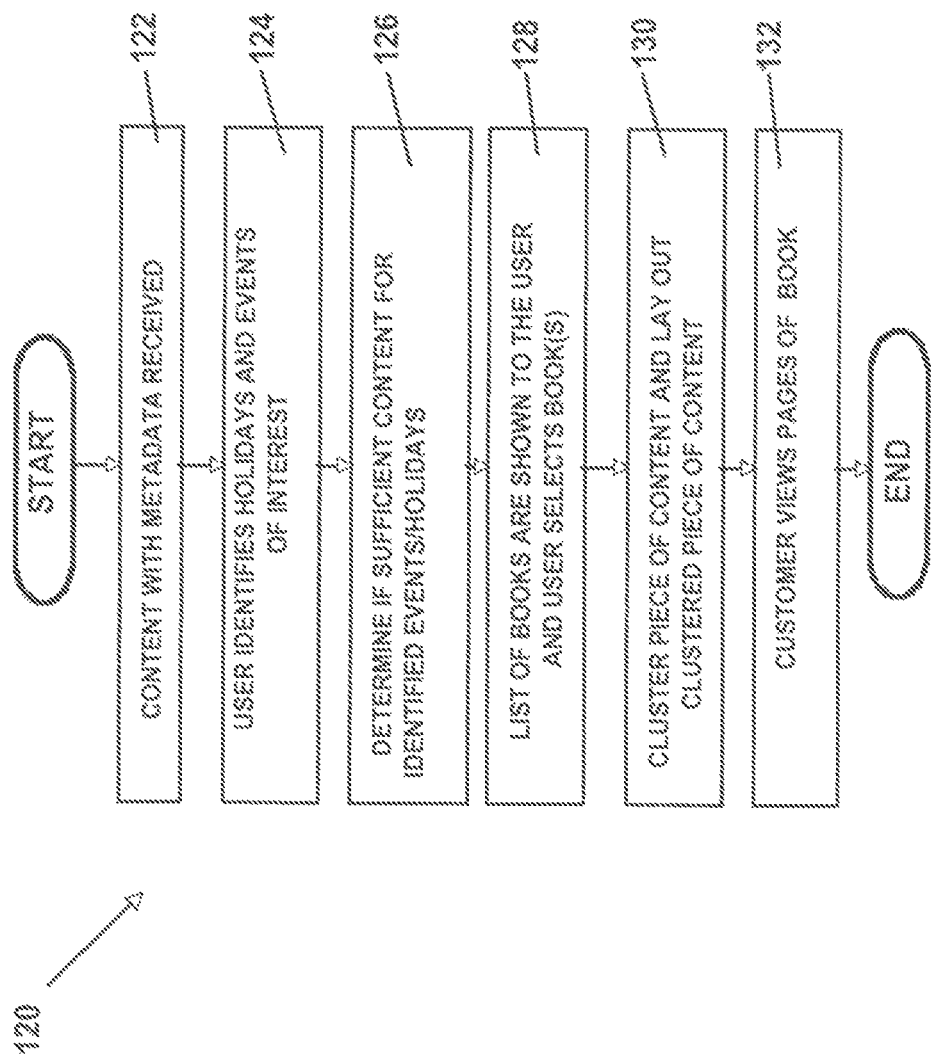
FIG. 2 illustrates a method for automatic identification of content books and generation of the content books.
Figure 5:
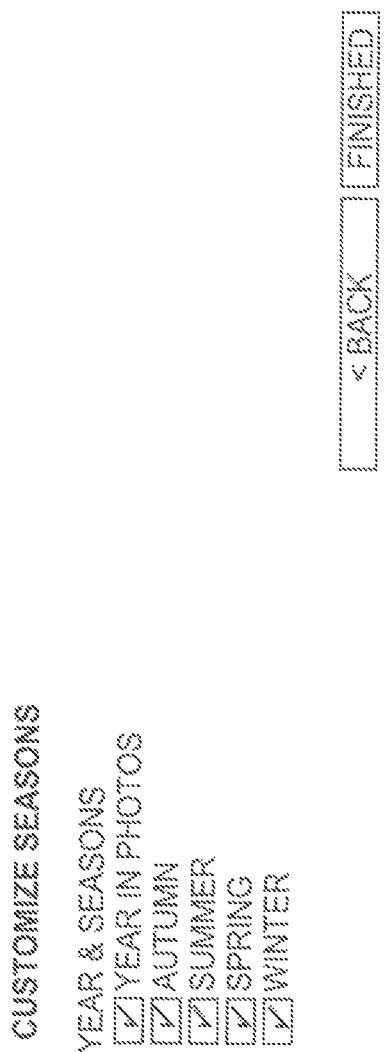
FIG. 5 is an example of a user interface for adding customized seasons.

FIG. 2 illustrates a method 120 for automatic identification of content books and generation of the content books that may be implemented by the client application described above although it can also be implemented using other hardware/software. In the implementation in which the client application is performing the method, the client application has components that perform the processes described below. In the method, content with metadata is received/available for processing (122). In one embodiment use the illustration, the content may be pictures/images. In other embodiments, the content may be text, line drawings, cartoons and the like. The metadata for each piece of content may include for example, a dateTaken piece of data, a file size piece of data and a file name piece of data. The dateTaken data will be retrieved from the EXIF data that the camera writes to the image file, so that it will be the actual date and time that the piece of content is taken. If that data does not exist in the file, it is ignored. In the method, the user may identify one or more holidays, events, customized events of interest to the user (124). For example, FIGS. 3, 4 and 5 are examples of a user interface (of the client application) that allow the user to add a customized event, add customized holidays and add customized seasons so that the user can identify the events (wedding day or birthdays as shown in FIG. 3), holidays (such as religious holidays (Christmas, Easter, Hanukkah), national holidays (Thanksgiving, Independence Day, Cinco de Mayo) and/or US/Canadian holidays as shown in FIG. 4) and/or seasons (year in photos, autumn, summer, spring and winter as shown in FIG. 5) that are of interest to the particular user.

Once the user has selected the events, holidays and/or seasons of interest to the user, the method determines (126) from the piece of content of the user with the metadata and a minimum number of photos required to make a photo book (which is configurable, but may, for example, be 30 pieces of content), which of the user's selected events, holidays and/or seasons of interest have enough pieces of content associated with the events, holidays and/or seasons of interest to fill a content book. In particular, for each holiday (or event), the system has a date range. For instance, if the user selects Christmas, the start date is December 24th at 12:00:01 AM and the duration is 2 days. For Independence day, the start date is July 4th and the duration is 1 day. There are other holidays, such as Thanksgiving, Easter, Hanukkah, Labor Day, etc where the start date is calculated. In additions, the durations are also somewhat variable, for instance with Labor Day and Memorial Day, we include the preceding two days, so you actually get photos from the entire three day weekend. For birthdays, the system uses the 5 days prior to and 5 days after the birthday, to try to include any birthday parties that may occur on weekends before or after a child's birthday that occurs mid-week. The user's selected events, holidays and/or seasons of interest that have sufficient pieces of content associated with them are then displayed to the user (128) so that the user can select one or more books to have the books created. FIG. 6 is an example of the user interface that displays the books to the user and allows the user to choose one or more of the books on the list.

When at least one book is selected by the user, for each selected book, the method clusters the images/photos and lays out the pages of the book (130). An example of the technique for performing the clustering and page layout is described in co-pending patent application Ser. No. 12/872,369 entitled "Image Clustering and Page Layout System and Method" that was filed on the same day as this application, the entirety of which is incorporated herein by reference. Once the pages are laid out, the customer can view the laid out pages (132). An example of the user interface of the laid out pages in shown in FIG. 7. At this point, the customer can purchase the book using the system described above.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A system for automatically identifying and generating a content book, comprising:

a processor;

an identifier and generating unit executed by the processor that, based on a set of content having metadata associated with each piece of content, identifies a content book and generates the content book, the identifier and generating unit further comprising a user interface component executed by the processor that allows the user to select one or more of an event, a holiday and a season, a determining component executed by the processor that determines if one of the selected event, selected holiday and selected season has a sufficient number of pieces of content associated with the selected event, selected holiday and selected season within a defined time window for one of the selected event, selected holiday and selected season to generate a content book and a lay out component that lays out one or more pages of a content book using the number of pieces of content associated with one of the selected event, selected holiday and selected season.

2. The system of claim 1, wherein the user interface component displays a list of each of the selected event, selected holiday and selected season that have sufficient pieces of content to generate a content book.

3. The system of claim 1, wherein the user interface component displays the lay out of the one or more pages of the content book.

4. The system of claim 1, wherein the identifier and generating unit further comprising a clustering component that clusters the number of pieces of content associated with one of the selected event, selected holiday and selected season into one or more clusters and wherein the lay out component lays out one or more pages of a content book using the number of pieces of content associated with one of the selected event, selected holiday and selected season and the one or more clusters.

5. The system of claim 1, wherein the identifier and generating unit further comprises a store that stores the set of content of the user.

6. A method for automatically identifying and generating a content book, comprising:
   receiving a set of content, each piece of content having metadata associated with the piece of content;
   selecting, using a user interface generated by a computing device, one or more of an event, a holiday and a season;
   determining, using the computing device, if one of the selected event, selected holiday and selected season has a sufficient number of pieces of content associated with the selected event, selected holiday and selected season within a defined time window for one of the selected event, selected holiday and selected season to generate a content book;
   selecting, using the user interface of the computing device, one of the selected event, selected holiday and selected season that have sufficient number of pieces of content; and
   laying out one or more pages of a content book using the number of pieces of content associated with one of the selected event, selected holiday and selected season.

7. The method of claim 6, wherein selecting one of the selected event, selected holiday and selected season further comprises displaying, on the user interface generated by the computing device, a list of each of the selected event, selected holiday and selected season that have sufficient pieces of content to generate a content book.

8. The method of claim 6 further comprising displaying, on a display of the computing device, the laid out one or more pages of the content book.

9. The method of claim 6 further comprising clustering the number of pieces of content associated with one of the selected event, selected holiday and selected season into one or more clusters and wherein the laying out one or more pages of a content book further comprises laying out one or more pages of a content book using the number of pieces of content associated with one of the selected event, selected holiday and selected season and the one or more clusters.

* * * * *